United States Patent
Roh et al.

(10) Patent No.: US 12,486,223 B2
(45) Date of Patent: Dec. 2, 2025

(54) METHOD OF PREPARING A THIOMETHYLPHENOL DERIVATIVE

(71) Applicant: KOREA KUMHO PETROCHEMICAL CO., LTD., Seoul (KR)

(72) Inventors: Kee Yoon Roh, Daejeon (KR); Sang Hun Jang, Asan-si (KR); Jung Hei Choi, Daejeon (KR)

(73) Assignee: KOREA KUMHO PETROCHEMICAL CO., LTD., Seoul (KR)

(*) Notice: Subject to any disclaimer, the term of this patent is extended or adjusted under 35 U.S.C. 154(b) by 623 days.

(21) Appl. No.: 17/911,886

(22) PCT Filed: Oct. 18, 2021

(86) PCT No.: PCT/KR2021/014452
§ 371 (c)(1),
(2) Date: Sep. 15, 2022

(87) PCT Pub. No.: WO2022/092655
PCT Pub. Date: May 5, 2022

(65) Prior Publication Data
US 2023/0130731 A1    Apr. 27, 2023

(30) Foreign Application Priority Data
Oct. 30, 2020  (KR) .......... 10-2020-0143611

(51) Int. Cl.
C07C 323/16    (2006.01)
C07C 315/02    (2006.01)
C07C 319/14    (2006.01)

(52) U.S. Cl.
CPC .......... *C07C 323/16* (2013.01); *C07C 315/02* (2013.01); *C07C 319/14* (2013.01)

(58) Field of Classification Search
None
See application file for complete search history.

(56) References Cited

U.S. PATENT DOCUMENTS

2008/0081929 A1    4/2008    Lee et al.

FOREIGN PATENT DOCUMENTS

| CN | 1515549 A | 7/2004 |
| CN | 102491925 A | 6/2012 |

(Continued)

OTHER PUBLICATIONS

Machine generated English language translation of Lin (CN105418469A, published on Mar. 23, 2016,) obtained May 7, 2025. (Year: 2025).*

(Continued)

*Primary Examiner* — Amy C Bonaparte
(74) *Attorney, Agent, or Firm* — Sughrue Mion, PLLC

(57) ABSTRACT

A method of preparing a thiomethylphenol derivative is disclosed, the method including: (a) carrying out a primary reaction of a phenol derivative represented by the following Chemical Formula 2, a mercaptan derivative represented by $R_4SH$, and paraformaldehyde at a reaction temperature $T_1$ under conditions in which a heterocyclic base having 3 to 10 carbon atoms and an acid are simultaneously present; and (b) carrying out a secondary reaction at a reaction temperature $T_2$ to prepare a thiomethylphenol derivative represented by the following Chemical Formula 1, wherein $T_1<T_2$ is satisfied.

17 Claims, 1 Drawing Sheet

(56) References Cited

FOREIGN PATENT DOCUMENTS

| | | | |
|---|---|---|---|
| CN | 103408475 A | 11/2013 |
| CN | 105418469 A | 3/2016 |
| KR | 10-2001-0070468 A | 7/2001 |
| KR | 10-0813173 B1 | 3/2008 |
| KR | 10-0813174 B1 | 3/2008 |
| KR | 10-2009-0091605 A | 8/2009 |
| KR | 10-0926796 B1 | 11/2009 |
| KR | 10-0963311 B1 | 6/2010 |

OTHER PUBLICATIONS

International Search Report of PCT/KR2021/014452 dated Feb. 15, 2022 [PCT/ISA/210].

* cited by examiner

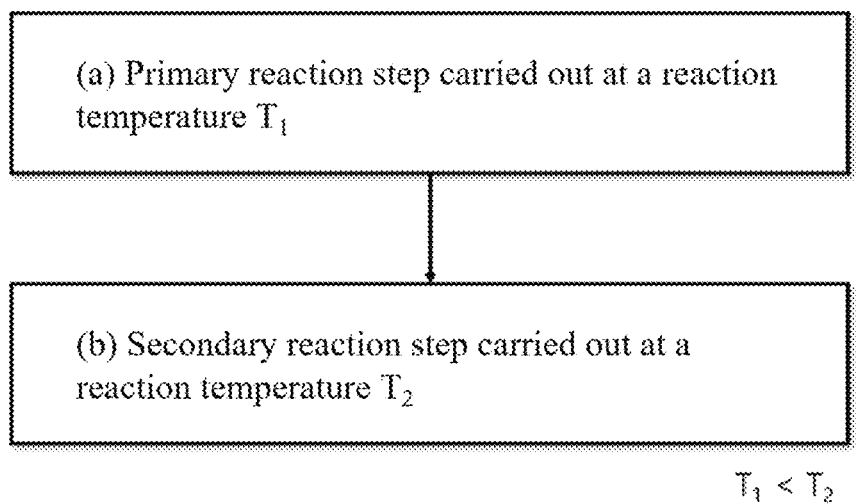

METHOD OF PREPARING A THIOMETHYLPHENOL DERIVATIVE

TECHNICAL FIELD

The present invention relates to a method of preparing a thiomethylphenol derivative.

BACKGROUND ART

Thiomethylphenol derivatives are used as antioxidants in plastics, rubbers, and oils.

Such thiomethylphenol derivatives are prepared by reacting phenol derivatives with paraformaldehyde and mercaptan derivatives in the presence of a catalyst, but various methods have been tried to improve this reaction because the reaction temperature is excessively high or the reaction time is long.

For example, a method of carrying out the reaction in the presence of a base or using a reducing agent has been proposed, but there are problems in that the purification time is excessively long and discoloration occurs during the reaction and purification process.

Korean Patent Registration Nos. 813173, 813174, 926796, 963311, etc. have proposed a method of reducing discoloration by carrying out a reaction under a condition in which a base and an acid are simultaneously present and purifying with an acid.

DISCLOSURE

Technical Problem

The object of the present invention is to provide a method of preparing a thiomethylphenol derivative that further reduces discoloration of the final product, improves stability, and improves the eco-friendliness of the purification process and the energy efficiency of the entire process.

Technical Solution

According to one aspect, the present invention provides a method of preparing a thiomethylphenol derivative, including:
(a) carrying out a primary reaction of a phenol derivative represented by the following Chemical Formula 2, a mercaptan derivative represented by $R_4SH$, and paraformaldehyde at a reaction temperature $T_1$ under conditions in which a heterocyclic base having 3 to 10 carbon atoms and an acid are simultaneously present; and (b) carrying out a secondary reaction at a reaction temperature $T_2$ to prepare a thiomethylphenol derivative represented by the following Chemical Formula 1; wherein $T_1 < T_2$ is satisfied,

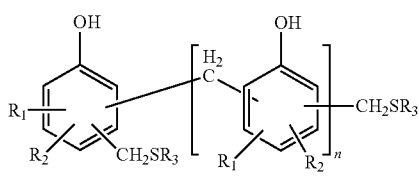

[Chemical Formula 1]

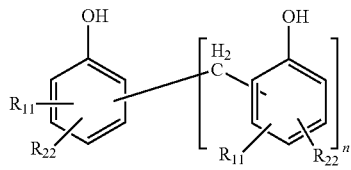

[Chemical Formula 2]

wherein $R_1$ and $R_2$ are each independently selected from hydrogen, deuterium, a $C_1$ to $C_{16}$ straight or branched alkyl group, a $C_5$ to $C_{16}$ cycloalkyl group or aromatic-containing alkyl group, —$CH_2SR_3$; $R_3$ and $R_4$ are each independently selected from a $C_1$ to $C_{16}$ straight or branched alkyl group, a $C_5$ to $C_{16}$ cycloalkyl group, or aromatic-containing alkyl group; $R_{11}$ and $R_{22}$ are each independently selected from hydrogen, deuterium, a $C_1$ to $C_{16}$ straight or branched alkyl group, a $C_5$ to $C_{16}$ cycloalkyl group or aromatic-containing alkyl group; and n is 0 or 1.

In one embodiment, the method of preparing the thiomethylphenol derivative may satisfy $95°\ C. < T_1 + 5°\ C. \leq T_2 < 120°\ C.$ In one embodiment, steps (a) and (b) may be carried out for 1 to 5 hours, respectively.

In one embodiment, step (a) may be carried out in the presence of 0.5 to 50.0 equivalents of a solvent based on 1 equivalent of the phenol derivative.

In one embodiment, the solvent may be water or an alcohol.

In one embodiment, 0.01 to 0.50 equivalents of the base may be used based on 1 equivalent of the phenol derivative in step (a).

In one embodiment, the base in step (a) may be at least one selected from the group consisting of pyrrole, pyrrolidine, imidazole, pyridine, piperidine, piperazine and pyrazine.

In one embodiment, 0.01 to 0.90 equivalents of the acid may be used based on 1 equivalent of the phenol derivative in step (a).

In one embodiment, the acid in step (a) may be at least one selected from the group consisting of chlorous acid, phosphoric acid, arsenic acid, chloroacetic acid, hydrofluoric acid, nitrous acid, formic acid, benzoic acid, hydrazoic acid, acetic acid, propionic acid and carbonic acid.

In one embodiment, 2.0 to 6.0 equivalents of the mercaptan derivative may be used based on 1 equivalent of the phenol derivative in step (a).

In one embodiment, 2.0 to 6.0 equivalents of the paraformaldehyde may be used based on 1 equivalent of the phenol derivative in step (a).

In one embodiment, after step (b), (c) a purification step of washing the organic layer of the product of step (b) with an acid may be further included.

In one embodiment, the acid in step (c) may have a pKa of 2.0 or more.

In one embodiment, the acid in step (c) may be at least one selected from the group consisting of chlorous acid, phosphoric acid, arsenic acid, chloroacetic acid, hydrofluoric acid, nitrous acid, formic acid, benzoic acid, hydrazoic acid, acetic acid, propionic acid and carbonic acid.

In one embodiment, after step (c), (d) washing with a base or water may be further included.

In one embodiment, the base may be at least one selected from the group consisting of anhydrous sodium carbonate, sodium percarbonate and sodium hydrogen carbonate.

In one embodiment, after step (d), (e) isolating the thiomethylphenol derivative represented by Formula 1 by concentration under reduced pressure at 90 to 120° C. for 1 to 5 hours may be further included.

In one embodiment, the isolated thiomethylphenol derivative may have an APHA value of less than 75 after standing at 120° C. for 72 hours.

Advantageous Effects

According to one aspect, there can be provided a method of preparing a thiomethylphenol derivative in which the stability of the final product is improved, discoloration in the process is minimized, and the energy efficiency of the preparation process and the economic efficiency of the purification process are improved.

The effect of one aspect of the present specification is not limited to the above-described effect, and it should be understood to include all effects that can be inferred from the configuration described in the detailed description or claims of the present specification.

BRIEF DESCRIPTION OF THE DRAWINGS

The FIGURE shows a schematic diagram of a method of preparing a thiomethylphenol derivative according to an embodiment of the present specification.

DETAILED DESCRIPTION OF THE PREFERRED EMBODIMENTS

Hereinafter, one aspect of the present specification will be described with reference to the accompanying drawings. However, the description of the present specification may be implemented in several different forms, and thus is not limited to the embodiments described herein. In order to clearly illustrate the present invention in the drawings, parts irrelevant to the description are omitted, and the same reference numerals are added to the same or similar parts throughout the specification.

Throughout the specification, when a part is "connected" with another part, this includes not only the case where it is "directly connected" but also the case where it is "indirectly connected" with another member interposed therebetween. In addition, when a part is said to "include" a component, this means that other components may be further included, not excluded, unless specifically stated to the contrary.

When a range of numerical values is recited herein, the values have the precision of the significant figures provided in accordance with the standard rules in chemistry for significant figures, unless the specific range is otherwise stated. For example, 10 includes the range of 5.0 to 14.9 and the number 10.0 includes the range of 9.50 to 10.49.

Hereinafter, one embodiment of the present invention will be described in detail with reference to the accompanying drawings.

Method of Preparing Thiomethylphenol Derivatives

A method of preparing a thiomethylphenol derivative includes (a) carrying out a primary reaction of a phenol derivative represented by the following Chemical Formula 2, a mercaptan derivative represented by $R_4SH$, and paraformaldehyde at a reaction temperature $T_1$ under conditions in which a heterocyclic base having 3 to 10 carbon atoms and an acid are simultaneously present; and (b) carrying out a secondary reaction at a reaction temperature $T_2$ to prepare a thiomethylphenol derivative represented by the following Chemical Formula 1, wherein $T_1 < T_2$ is satisfied.

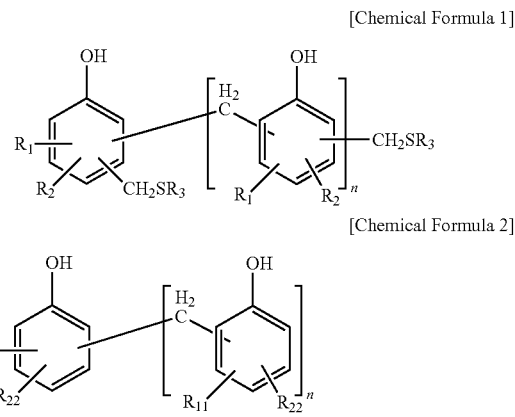

[Chemical Formula 1]

[Chemical Formula 2]

wherein $R_1$ and $R_2$ are each independently selected from hydrogen, deuterium, a $C_1$ to $C_{16}$ straight or branched alkyl group, a $C_5$ to $C_{16}$ cycloalkyl group or aromatic-containing alkyl group, $-CH_2SR_3$; $R_3$ and $R_4$ are each independently selected from a $C_1$ to $C_{16}$ straight or branched alkyl group, a $C_5$ to $C_{16}$ cycloalkyl group, or aromatic-containing alkyl group; $R_{11}$ and $R_{22}$ are each independently selected from hydrogen, deuterium, a $C_1$ to $C_{16}$ straight or branched alkyl group, a $C_5$ to $C_{16}$ cycloalkyl group or aromatic-containing alkyl group; and n is 0 or 1.

Referring to the FIGURE, the method of preparing the thiomethylphenol derivative includes the primary reaction carried out at the reaction temperature $T_1$ and the secondary reaction carried out at $T_2$, which is a higher reaction temperature than the primary reaction temperature, wherein the purity of the final product can be improved, and thermal stability can be significantly improved by changing the composition of the by-products that may be partially included.

The method of preparing the thiomethylphenol derivative may satisfy 95° C.$<T_1+5$° C.$\leq T_2<120$° C. When the temperature of $T_1$ is 90° C. or less, the reaction may proceed insufficiently, and when the temperature of $T_2$ is 120° C. or more, efficiency compared to the energy used may be insufficient. When the temperature difference between $T_1$ and $T_2$ is 5° C. or more, the above-described purity improvement and thermal stability improvement may be effectively realized.

Steps (a) and (b) are each carried out for 1 to 5 hours, for example, 1 hour, 1.5 hours, 2 hours, 2.5 hours, 3 hours, 3.5 hours, 4 hours, 4.5 hours, 5 hours or a period of time in a range between two of these values.

The phenol derivative may be at least one selected from the group consisting of o-cresol, p-cresol, 4-butylphenol and bisphenol.

Step (a) may be carried out in the presence of 0.5 to 50.0 equivalents, for example, 0.5 equivalents, 1.0 equivalent, 1.5 equivalents, 2.0 equivalents, 2.5 equivalents, 3.0 equivalents, 3.5 equivalents, 4.0 equivalents, 4.5 equivalents, 5.0 equivalents, 5.5 equivalents, 6.0 equivalents, 6.5 equivalents, 7.0 equivalents, 7.5 equivalents, 8.0 equivalents, 8.5 equivalents, 9.0 equivalents, 9.5 equivalents, 10.0 equivalents, 10.5 equivalents, 11.0 equivalents, 11.5 equivalents, 12.0 equivalents, 12.5 equivalents, 13.0 equivalents, 13.5 equivalents, 14.0 equivalents, 14.5 equivalents, 15.0 equivalents, 15.5 equivalents, 16.0 equivalents, 16.5 equivalents, 17.0 equivalents, 17.5 equivalents, 18.0 equivalents, 18.5 equivalents, 19.0 equivalents, 19.5 equivalents, 20.0 equivalents, 20.5 equivalents, 21.0 equivalents, 21.5 equivalents, 22.0 equivalents, 22.5 equivalents, 23.0 equivalents, 23.5 equivalents, 24.0 equivalents, 24.5 equivalents, 25.0 equivalents, 25.5 equivalents, 26.0 equivalents, 26.5 equivalents, 27.0 equivalents, 27.5 equivalents, 28.0 equivalents, 28.5 equivalents, 29.0 equivalents, 29.5 equivalents, 30.0 equivalents, 30.5 equivalents, 31.0 equivalents, 31.5 equivalents, 32.0 equivalents, 32.5 equivalents, 33.0 equivalents, 33.5 equivalents, 34.0 equivalents, 34.5 equivalents, 35.0 equivalents, 35.5 equivalents, 36.0 equivalents, 36.5 equivalents, 37.0 equivalents, 37.5 equivalents, 38.0 equivalents, 38.5 equivalents, 39.0 equivalents, 39.5 equivalents, 40.0 equivalents, 40.5 equivalents, 41.0 equivalents, 41.5 equivalents, 42.0 equivalents, 42.5 equivalents, 43.0 equivalents, 43.5 equivalents, 44.0 equivalents, 44.5 equivalents, 45.0 equivalents, 45.5 equivalents, 46.0 equivalents, 46.5 equivalents, 47.0 equivalents, 47.5 equivalents, 48.0 equivalents, 48.5 equivalents, 49.0 equivalents, 49.5 equivalents, 50.0 equivalents of a solvent or ranges between two of these values, based on 1 equivalent of the phenol derivative. When the content of the solvent is out of the above range, reactivity may be reduced.

The solvent may be water or an alcohol. The alcohol may be, for example, at least one selected from the group consisting of methanol, ethanol, propanol, isopropanol and butanol.

In step (a), 0.01 to 0.50 equivalents, for example, 0.01 equivalents, 0.05 equivalents, 0.10 equivalents, 0.15 equivalents, 0.20 equivalents, 0.25 equivalents, 0.30 equivalents, 0.35 equivalents, 0.40 equivalents, 0.45 equivalents, 0.50 equivalents of a base or ranges between two of these values based on 1 equivalent of the phenol derivative can be used. When the amount of the base used is excessively small, the reaction time is unnecessarily long, and when the amount of the base is excessively large, product characteristics may be altered due to by-products.

The heterocyclic base is one in which at least one of the constituent carbons of a cyclic alkane, a cyclic alkene, a cyclic alkyne, or an aromatic hydrocarbon is changed to a heteroatom, and in one example, the heterocyclic base in step (a) may be at least one selected from the group consisting of pyrrole, pyrrolidine, imidazole, pyridine, piperidine, piperazine and pyrazine.

In step (a), 0.01 to 0.90 equivalents, for example, 0.01 equivalents, 0.05 equivalents, 0.10 equivalents, 0.15 equivalents, 0.20 equivalents, 0.25 equivalents, 0.30 equivalents, 0.35 equivalents, 0.40 equivalents, 0.45 equivalents, 0.50 equivalents, 0.55 equivalents, 0.60 equivalents, 0.65 equivalents, 0.70 equivalents, 0.75 equivalents, 0.80 equivalents, 0.85 equivalents, 0.90 equivalents of an acid or ranges between two of these values based on 1 equivalent of the phenol derivative can be used. When the amount of acid used in step (a) satisfies the above range, the reaction temperature and time conditions may be more advantageous.

The acid in step (a) may be at least one selected from the group consisting of chlorous acid, phosphoric acid, arsenic acid, chloroacetic acid, hydrofluoric acid, nitrous acid, formic acid, benzoic acid, hydrazoic acid, acetic acid, propionic acid and carbonic acid.

In one example, when step (a) is carried out under conditions in which a heterocyclic base and an acid are simultaneously present, the base and paraformaldehyde as reactants form an aminomethanol intermediate, which is converted to a highly reactive imine by the acid, so that the reactivity with phenol is maximized, and oxidation of the base can be prevented. In addition, the heterocyclic base minimizes the space interference for intermolecular reaction compared to the straight-chain base, so that the reaction rate can be improved.

In step (a), 2.0 to 6.0 equivalents, for example, 2.0 equivalents, 2.5 equivalents, 3.0 equivalents, 3.5 equivalents, 4.0 equivalents, 4.5 equivalents, 5.0 equivalents, 5.5 equivalents, 6.0 equivalents of a mercaptan derivative or ranges between two of these values based on 1 equivalent of the phenol derivative can be used. When the amount of the mercaptan derivative used is excessively small, a mixture of, for example, monothiomethylphenol and dithiomethylphenol may be generated due to an unreacted reaction, and when it is excessively large, by-products may increase and the purification time may be unnecessarily long.

The mercaptan derivative may be at least one selected from the group consisting of octane mercaptan, decane mercaptan, dodecane mercaptan, benzyl mercaptan and thiophenol.

In step (a), 2.0 to 6.0 equivalents, for example, 2.0 equivalents, 2.5 equivalents, 3.0 equivalents, 3.5 equivalents, 4.0 equivalents, 4.5 equivalents, 5.0 equivalents, 5.5 equivalents, 6.0 equivalents of paraformaldehyde or ranges between two of these values based on 1 equivalent of the phenol derivative can be used. When the amount of paraformaldehyde used is excessively small, a mixture of, for example, monothiomethylphenol and dithiomethylphenol may be generated due to an unreacted reaction, and when excessively large, the purification time may be unnecessarily long.

After step (b), (c) a purification step of washing the organic layer of the product of step (b) with an acid may be further included. In the organic layer, in addition to the thiomethylphenol derivative, aminomethanol, which is a reaction intermediate, etc. may remain, causing discoloration of the final product. Accordingly, in addition to the above-described two-step reaction, discoloration can be minimized by decomposing or removing aminomethanol with a certain amount of acid for purification.

The acid in step (c) may have a pKa of 2.0 or more, and may be, for example, at least one selected from the group consisting of chlorous acid, phosphoric acid, arsenic acid, chloroacetic acid, hydrofluoric acid, nitrous acid, formic acid, benzoic acid, hydrazoic acid, acetic acid, propionic acid and carbonic acid.

When the acid is phosphoric acid, the concentration may be 15% or more, and when the acid is acetic acid, the concentration may be more than 5%.

After step (c), (d) washing with a base or water may be further included.

The base may be at least one selected from the group consisting of anhydrous sodium carbonate, sodium percarbonate and sodium hydrogen carbonate.

Step (d) may be to neutralize and remove the acid used in step (c), but when the acid in step (c) is acetic acid having a concentration of more than 5%, by-products can be sufficiently removed by omitting the neutralization process and just washing with water, which can be economically advantageous.

After step (d), (e) isolating the thiomethylphenol derivative represented by Formula 1 by concentration under reduced pressure at 90 to 120° C. for 1 to 5 hours may be further included. The concentration under reduced pressure may be carried out at 90° C., 95° C., 100° C., 105° C., 110° C., 115° C., 120° C. or a temperature in a range between two of these values, for 1 hour, 1.5 hours, 2 hours, 2.5 hours, 3 hours, 3.5 hours, 4 hours, 4.5 hours, 5 hours, or a period of time in a range between two of these values.

When the temperature at the time of concentration under reduced pressure satisfies the above range, the residual amount of the mercaptan derivative in the final product may be less than 0.1 wt %, and in particular, when the temperature is 110° C. or higher, it can be further reduced to less than 0.01 wt %.

The isolated thiomethylphenol derivative may have an APHA value of less than 75, less than 70, less than 65, less than 60, less than 55 or less than 50 after being left at 120° C. for 72 hours.

Hereinafter, examples of the present specification will be described in more detail. However, the following experimental results describe only representative experimental results among the above examples, and the scope and content of the present specification may not be construed as reduced or limited by the examples. Each effect of the various embodiments of the present specification not explicitly presented below will be specifically described in the corresponding section.

Example 1

To a mixture of 100 parts by weight of o-cresol, 3 equivalents of paraformaldehyde, 2 equivalents of n-octanethiol, and 0.3 equivalents of piperidine, 0.01 equivalents of phosphoric acid and 0.1 equivalents of acetic acid added to 1.0 equivalent of water as a solvent was added, and after the resultant was reacted at 100° C. for 2 hours, the temperature was raised to 115° C. and reacted for 3 hours to obtain a reaction product. The aqueous layer was removed from the reaction product, the organic layer was washed with 8.5% acetic acid, washed with water, and then concentrated under reduced pressure at 115° C. for 3 hours to obtain 2,4-bis(n-octylthiomethyl)-6-methylphenol as a colorless liquid. The conversion rate of 2,4-bis(n-octylthiomethyl)-6-methylphenol obtained above was 100%, and the purity was 98.0%. The residual n-octanethiol content was found to be 0.005%.

Example 2

To a mixture of 100 parts by weight of o-cresol, 2 equivalents of n-octanethiol, 3 equivalents of paraformaldehyde, and 0.3 equivalents of piperidine, 0.01 equivalents of phosphoric acid and 0.1 equivalents of acetic acid added to 1.0 equivalent of water as a solvent was added, and after the resultant was reacted at 100° C. for 2 hours, the temperature was raised to 115° C. and reacted for 3 hours to obtain a reaction product. The aqueous layer was removed from the reaction product, the organic layer was washed with 8.5% acetic acid, washed with water, and then concentrated under reduced pressure at 100° C. for 3 hours to obtain 2,4-bis(n-octylthiomethyl)-6-methylphenol as a colorless liquid. The conversion rate of 2,4-bis(n-octylthiomethyl)-6-methylphenol obtained above was 100%, and the purity was 98.1%. The residual n-octanethiol content was found to be 0.02%.

Example 3

To a mixture of 100 parts by weight of o-cresol, 3 equivalents of paraformaldehyde, 2 equivalents of n-octanethiol, and 0.3 equivalents of piperidine, 0.01 equivalents of phosphoric acid and 0.1 equivalents of acetic acid added to 1.0 equivalent of water as a solvent was added, and after the resultant was reacted at 100° C. for 2 hours, the temperature was raised to 115° C. and reacted for 3 hours to obtain a reaction product. The aqueous layer was removed from the reaction product, the organic layer was washed with 17% phosphoric acid, washed with 10% aqueous sodium carbonate solution, and then concentrated under reduced pressure at 100° C. for 3 hours to obtain 2,4-bis(n-octylthiomethyl)-6-methylphenol as a colorless liquid. The conversion rate of 2,4-bis(n-octylthiomethyl)-6-methylphenol obtained above was 100%, and the purity was 97.8%. The residual n-octanethiol content was found to be 0.03%.

Example 4

To a mixture of 100 parts by weight of o-cresol, 2 equivalents of n-octanethiol, 3 equivalents of paraformaldehyde, and 0.3 equivalents of piperidine, 0.01 equivalents of phosphoric acid and 0.1 equivalents of acetic acid added to 1.0 equivalent of water as a solvent was added, and after the resultant was reacted at 105° C. for 2 hours, the temperature was raised to 110° C. and reacted for 3 hours to obtain a reaction product. The aqueous layer was removed from the reaction product, the organic layer was washed with 17% phosphoric acid, washed with 10% aqueous sodium carbonate solution, and then concentrated under reduced pressure at 115° C. for 3 hours to obtain 2,4-bis(n-octylthiomethyl)-6-methylphenol as a colorless liquid. The conversion rate of 2,4-bis(n-octylthiomethyl)-6-methylphenol obtained above was 100%, and the purity was 97.9%. The residual n-octanethiol content was found to be 0.0006%.

Example 5

2 equivalents of n-octanethiol, 3 equivalents of paraformaldehyde, 1.0 equivalent of water, 0.01 equivalents of phosphoric acid, 0.1 equivalents of acetic acid, 0.3 equivalents of piperidine, and 100 parts by weight of o-cresol were reacted at 95° C. for 2 hours, and then at 105° C. for 3 hours to obtain a reaction product. The aqueous layer was removed from the reaction product, the organic layer was washed with 8.5% acetic acid, washed with water, and then concentrated under reduced pressure at 115° C. for 3 hours to obtain 2,4-bis(n-octylthiomethyl)-6-methylphenol as a colorless liquid. The conversion rate of 2,4-bis(n-octylthiomethyl)-6-methylphenol obtained above was 100%, and the purity was 97.1%. The residual n-octanethiol content was found to be 0.005%.

Comparative Example 1

To a mixture of 100 parts by weight of o-cresol, 3 equivalents of paraformaldehyde, 2 equivalents of n-octanethiol, and 0.2 equivalents of dimethylamine, 0.15 equivalents of acetic acid added to 1.0 equivalent of water as a solvent was added, and then the resultant was reacted at 120° C. for 5 hours to obtain a reaction product. The aqueous layer was removed from the reaction product, the organic layer was washed with 8.5% acetic acid, washed with water, and then concentrated under reduced pressure for 3 hours to obtain 2,4-bis(n-octylthiomethyl)-6-methylphenol as a colorless liquid. The conversion rate of 2,4-bis(n-octylthiomethyl)-6-methylphenol obtained above was 100%, and the purity was 97.0%.

Comparative Example 2

To a mixture of 100 parts by weight of o-cresol, 3 equivalents of paraformaldehyde, 2 equivalents of n-octanethiol, and 0.3 equivalents of piperidine, 0.01 equivalents of phosphoric acid and 0.1 equivalents of acetic acid added to 1.0 equivalent of water as a solvent was added, and then the resultant was reacted at 100° C. for 5 hours to obtain a reaction product. The aqueous layer was removed from the reaction product, the organic layer was washed with 17% phosphoric acid, washed with 10% aqueous sodium carbonate solution, and then concentrated under reduced pressure for 3 hours to obtain 2,4-bis(n-octylthiomethyl)-6-methylphenol as a colorless liquid. The conversion rate of 2,4-bis(n-octylthiomethyl)-6-methylphenol obtained above was 100%, and the purity was 96.3%.

Comparative Example 3

2,4-bis(n-octylthiomethyl)-6-methylphenol was obtained as a colorless liquid in the same manner as in Comparative Example 2, except that the organic layer was washed with 7% sulfuric acid and post-treated with a 10% aqueous sodium carbonate solution. The conversion rate of 2,4-bis(n-octylthiomethyl)-6-methylphenol obtained above was 100%, and the purity was 97.5%.

Comparative Example 4

2,4-bis(n-octylthiomethyl)-6-methylphenol was obtained as a colorless liquid in the same manner as in Comparative Example 2, except that the organic layer was washed with 5% sulfuric acid and post-treated with a 10% aqueous sodium carbonate solution. The conversion rate of 2,4-bis(n-octylthiomethyl)-6-methylphenol obtained above was 100%, and the purity was 97.4%.

Comparative Example 5

2,4-bis(n-octylthiomethyl)-6-methylphenol was obtained as a colorless liquid in the same manner as in Comparative Example 2, except that the organic layer was washed with 3% sulfuric acid and post-treated with a 10% aqueous sodium carbonate solution. The conversion rate of 2,4-bis(n-octylthiomethyl)-6-methylphenol obtained above was 100%, and the purity was 97.9%.

Comparative Example 6

2,4-bis(n-octylthiomethyl)-6-methylphenol was obtained as a colorless liquid in the same manner as in Comparative Example 2, except that the organic layer was washed with 1% sulfuric acid and post-treated with a 10% aqueous sodium carbonate solution. The conversion rate of 2,4-bis(n-octylthiomethyl)-6-methylphenol obtained above was 100%, the purity was 97.5%, and by-products were present.

Comparative Example 7

2,4-bis(n-octylthiomethyl)-6-methylphenol was obtained as a colorless liquid in the same manner as in Comparative Example 2, except that the organic layer was washed with 10% acetic acid and post-treated with water. The conversion rate of 2,4-bis(n-octylthiomethyl)-6-methylphenol obtained above was 100%, and the purity was 97.7%.

Comparative Example 8

2,4-bis(n-octylthiomethyl)-6-methylphenol was obtained as a colorless liquid in the same manner as in Comparative Example 2, except that the organic layer was washed with 8.5% acetic acid and post-treated with 10% sodium carbonate. The conversion rate of 2,4-bis(n-octylthiomethyl)-6-methylphenol obtained above was 100%, and the purity was 97.7%.

Comparative Example 9

2,4-bis(n-octylthiomethyl)-6-methylphenol was obtained as a colorless liquid in the same manner as in Comparative Example 2, except that the organic layer was washed with 8.5% acetic acid and post-treated with water. The conversion rate of 2,4-bis(n-octylthiomethyl)-6-methylphenol obtained above was 100%, and the purity was 97.5%.

Comparative Example 10

2,4-bis(n-octylthiomethyl)-6-methylphenol was obtained as a colorless liquid in the same manner as in Comparative Example 2, except that the organic layer was washed with 5% acetic acid and post-treated with 10% sodium carbonate. The conversion rate of 2,4-bis(n-octylthiomethyl)-6-methylphenol obtained above was 100%, the purity was 97.5%, and by-products were present.

Comparative Example 11

2,4-bis(n-octylthiomethyl)-6-methylphenol was obtained as a colorless liquid in the same manner as in Comparative Example 2, except that the organic layer was washed with 5% acetic acid and post-treated with water. The conversion rate of 2,4-bis(n-octylthiomethyl)-6-methylphenol obtained above was 100%, the purity was 97.6%, and by-products were present.

Comparative Example 12

100 parts by weight of o-cresol, 3 equivalents of paraformaldehyde, 1.0 equivalent of water, 0.01 equivalents of phosphoric acid, 0.1 equivalents of acetic acid, 0.3 equivalents of piperidine, and 2 equivalents of n-octanethiol were reacted at 105° C. for 2 hours, and then at 95° C. for 3 hours to obtain a reaction product. The aqueous layer was removed from the reaction product, the organic layer was washed with acetic acid and water, and then concentrated under reduced pressure at 115° C. for 3 hours to obtain 2,4-bis(n-octylthiomethyl)-6-methylphenol as a colorless liquid, but the purity was 70.6%, by-products were present, and the content of unreacted n-octanethiol was 7.16%.

Comparative Example 13

The process was carried out in the same manner as in Example 5, except that the primary reaction was carried out at 80° C. and the secondary reaction was carried out at 90° C., but the reaction did not proceed sufficiently.

The by-product of Comparative Examples 6, 10, 11, and 12 was N-hydroxymethylpiperidine (NHP) represented by the following Chemical Formula 3, and its presence was confirmed by gas chromatography analysis.

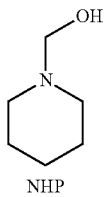

[Chemical Formula 3]

NHP

Referring to the Examples and Comparative Examples, in Examples 1 to 5, in which the secondary reaction was carried out by increasing the temperature after the primary reaction, it was possible to prepare a thiomethylphenol derivative with high purity. In particular, in Examples 1 to 5, the reaction was carried out at a relatively high 120° C., and a purity similar to or higher than Comparative Example 1 could be achieved.

In addition, after washing the organic layer with sulfuric acid having a pKa of −2, post-treatment with sodium carbonate could remove by-products when the sulfuric acid concentration was 3% or more, but there is a problem that corrosion of the reactor may occur (Comparative Examples 3 to 6). As a result of gas chromatography analysis, when a 17% aqueous solution of phosphoric acid having a pKa of more than 2.0 was used, the by-products could be removed without a problem of reactor corrosion (Comparative Example 2). In addition, when the organic layer was washed with acetic acid having a concentration of more than 5%, products of the same purity could be obtained without by-products only by post-treatment with water without neutralization of sodium carbonate (Comparative Examples 7 to 11).

In addition, it can be confirmed that as the temperature of concentration under reduced pressure carried out after acid treatment and post-treatment is higher, the content of the residual N-octanethiol content is significantly reduced (Examples 1 to 5).

Experimental Example 20 g of 2,4-bis(n-octylthiomethyl)-6-methylphenol prepared in Examples and Comparative Examples was placed in a vial in an oven, and the color change was measured at 120° C. for 3 days. Discoloration was confirmed by measuring the color (APHA). When the APHA value of the sample is low, the discoloration is small, and when the APHA value is high, the discoloration is severe. The lower the thermal stability, the more severe discoloration occurred.

TABLE 1

| Classification | Washing Process | Initial | 1 day | 2 days | 3 days |
|---|---|---|---|---|---|
| Example 1 | 8.5% acetic acid/water | 19 | 26 | 31 | 37 |
| Example 3 | 17% phosphoric acid/10% sodium carbonate | 37 | 46 | 60 | 61 |
| Comparative Example 1 | 8.5% acetic acid/water | 50 | 80 | 103 | 108 |
| Comparative Example 2 | 17% phosphoric acid/10% sodium carbonate | 43 | 60 | 71 | 78 |

Referring to Table 1, in Example 1 and Comparative Example 1, and Example 3 and Comparative Example 2, it can be confirmed that even though the same washing process is carried out, differences in the degree of discoloration occurred, and thermal stability is relatively excellent.

Although the cause of this difference is not clearly identified, this may be because the purity of the product is increased by the two-stage reaction at different reaction temperatures and a difference in the composition of impurities occurs.

Referring to the above examples, compared to the product prepared by reacting at the temperature of $T_2$ for 5 hours, the product prepared by reacting at the temperature of $T_1$ for 2 hours and reacting at the temperature of $T_2$ for 3 hours is superior in terms of purity and thermal stability, and energy consumption can also be minimized.

The description of the present specification described above is for illustration, and it should be understood that those of ordinary skill in the art to which one aspect of the present specification belongs can easily transform it into other specific forms without changing the technical idea or essential features described in this specification. Therefore, it should be understood that the embodiments described above are illustrative in all respects and not restrictive. For example, each component described as a single type may be implemented in a dispersed form, and likewise components described as distributed may be implemented in a combined form.

The scope of the present specification is indicated by the following claims, and all changes or modifications derived from the meaning and scope of the claims and their equivalents should be construed as being included in the scope of the present specification.

The invention claimed is:

1. A method of preparing a thiomethylphenol derivative, comprising:
   (a) carrying out a primary reaction of a phenol derivative represented by the following Chemical Formula 2, a mercaptan derivative represented by $R_4SH$, and paraformaldehyde at a reaction temperature $T_1$ under conditions in which a heterocyclic base having 3 to 10 carbon atoms and an acid are simultaneously present; and
   (b) carrying out a secondary reaction at a reaction temperature $T_2$ to prepare a thiomethylphenol derivative represented by the following Chemical Formula 1;
   wherein $95°$ C. $< T_1 + 5°$ C. $< T_2 < 120°$ C. is satisfied,

[Chemical Formula 1]

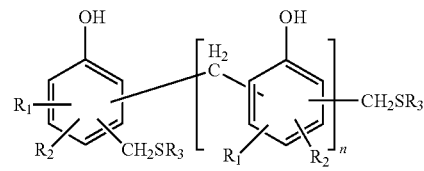

[Chemical Formula 2]

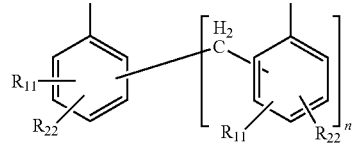

wherein, $R_1$ and $R_2$ are each independently selected from hydrogen, deuterium, a $C_1$ to $C_{16}$ straight or branched alkyl group, a $C_5$ to $C_{16}$ cycloalkyl group or a $C_5$ to $C_{16}$ aromatic-containing alkyl group, and $-CH_2SR_3$, $R_3$ and $R_4$ are each independently selected from a $C_1$ to $C_{16}$ straight or branched alkyl group, a $C_5$ to $C_{16}$ cycloalkyl group, or a $C_5$ to $C_{16}$ aromatic-containing alkyl group, $R_{11}$ and $R_{22}$ are each independently selected from hydrogen, deuterium, a $C_1$ to $C_{16}$ straight or branched alkyl group, a $C_5$ to $C_{16}$ cycloalkyl group or a $C_5$ to $C_{16}$ aromatic-containing alkyl group, n is 0 or 1.

2. The method of claim 1, wherein steps (a) and (b) are each carried out for 1 to 5 hours.

3. The method of claim 1, wherein step (a) is carried out in the presence of 0.5 to 50.0 equivalents by weight of a solvent based on 1 equivalent by weight of the phenol derivative.

4. The method of claim 3, wherein the solvent is water or an alcohol.

5. The method of claim 1, wherein 0.01 to 0.50 equivalents by weight of the heterocyclic base are used based on 1 equivalent by weight of the phenol derivative in step (a).

6. The method of claim 1, wherein the base in step (a) is at least one selected from the group consisting of pyrrole, pyrrolidine, imidazole, pyridine, piperidine, piperazine and pyrazine.

7. The method of claim 1, wherein 0.01 to 0.90 equivalents by weight of the acid are used based on 1 equivalent by weight of the phenol derivative in step (a).

8. The method of claim 1, wherein the acid in step (a) is at least one selected from the group consisting of chlorous acid, phosphoric acid, arsenic acid, chloroacetic acid, hydrofluoric acid, nitrous acid, formic acid, benzoic acid, hydrazoic acid, acetic acid, propionic acid and carbonic acid.

9. The method of claim 1, wherein 2.0 to 6.0 equivalents by weight of the mercaptan derivative are used based on 1 equivalent by weight of the phenol derivative in step (a).

10. The method of claim 1, wherein 2.0 to 6.0 equivalents by weight of the paraformaldehyde are used based on 1 equivalent by weight of the phenol derivative in step (a).

11. The method of claim 1, further comprising, after step (b), (c) a purification step of washing an organic layer formed after the reaction of step (b) with an acid.

12. The method of claim 11, wherein the acid in step (c) has a pKa of 2.0 or higher.

13. The method of claim 12, wherein the acid in step (c) is at least one selected from the group consisting of chlorous acid, phosphoric acid, arsenic acid, chloroacetic acid, hydrofluoric acid, nitrous acid, formic acid, benzoic acid, hydrazoic acid, acetic acid, propionic acid and carbonic acid.

14. The method of claim 11, further comprising (d) washing with a base or water after step (c).

15. The method of claim 14, wherein the base in step (d) is at least one selected from the group consisting of anhydrous sodium carbonate, anhydrous sodium percarbonate and anhydrous sodium hydrogen carbonate.

16. The method of claim 14, further comprising, after step (d), (e) isolating the thiomethylphenol derivative represented by Chemical Formula 1 by concentration under reduced pressure at 90 to 120° C. for 1 to 5 hours.

17. The method of claim 16, wherein the isolated thiomethylphenol derivative has an APHA value of less than 75 after standing at 120° C. for 72 hours.

* * * * *